United States Patent [19]

Lakhman

[11] Patent Number: 4,901,443
[45] Date of Patent: Feb. 20, 1990

[54] DEVICE FOR TAKING MEASUREMENTS FOR SEWING

[76] Inventor: Mikhail Lakhman, 328 Naughton Ave., Staten Island, N.Y. 10305

[21] Appl. No.: 261,139
[22] Filed: Oct. 24, 1988
[51] Int. Cl.⁴ .............................................. G01C 9/12
[52] U.S. Cl. ...................................................... 33/391
[58] Field of Search ..................... 33/391, 395, 396, 7, 33/511, 512

[56] References Cited

U.S. PATENT DOCUMENTS

| | | | |
|---|---|---|---|
| 449,557 | 3/1891 | Mounts | 33/391 |
| 691,146 | 1/1902 | Janin | 33/40 C |
| 729,480 | 5/1903 | Wolfe | 33/391 X |
| 2,220,029 | 10/1940 | Stephan | 33/391 |
| 2,580,601 | 1/1952 | Rouse | 33/391 |
| 3,803,721 | 4/1974 | Matsui | 33/283 |
| 4,747,217 | 5/1988 | Austin | 33/391 |

FOREIGN PATENT DOCUMENTS 95920 1/1898 Fed. Rep. of Germany ........... 33/7

Primary Examiner—Harry N. Haroian
Attorney, Agent, or Firm—Ilya Zborovsky

[57] ABSTRACT

The device for taking measurements for sewing has a housing with a circular peripheral edge and a straight transverse edge, a scale provided at the straight transverse edge for measuring a length of body parts, two scales provided at the circular peripheral edge for determining deviations of the body part from horizontal and vertical planes, and a standing surface provided on the housing.

5 Claims, 1 Drawing Sheet

DEVICE FOR TAKING MEASUREMENTS FOR SEWING

BACKGROUND OF THE INVENTION

The present invention relates to a device for taking measurements for sewing.

Devices of the above mentioned general type are known in the art. The known devices are formed as measuring tapes, templates provided with scales, measuring devices of measuring tape-type, etc. The known devices for taking measurements for sewing possess some disadvantages. More particularly, they are not sufficiently convenient in use and therefore can lead to errors in measurements. They do not provide a fixed reference position, which can also lead to errors in measurements. It is to be understood that the known devices can be further improved in these and other aspects.

SUMMARY OF THE INVENTION

Accordingly, it is an object of the present invention to provide a device for taking measurements for sewing, which avoids the disadvantages of the prior art.

In keeping with these objects and with others which will become apparent hereinafter, one feature of the present invention resides, briefly stated, in a device for taking measurements for sewing, comprising a housing having a semi-circular shape with a circular peripheral edge and a straight transverse edge, a scale provided at said straight transverse edge for determining a linear length of a body part, scales provided at said circular peripheral edge for determining a deviation of the body part from a horizontal plane and a vertical plane, and a standing surface provided in said housing at said straight transverse edge.

When the device is designed in accordance with the present invention, it achieves the above mentioned objects. The device can be reliably placed by its standing surface on a body part to be measured and then it will show simultaneously the length or other linear dimension, and a deviation from horizontal or vertical planes.

The novel features of the present invention are set forth in particular in the appended claims. The invention itself will be best understood from the following description of a preferred embodiment which is accompanied by the following drawings.

DESCRIPTION OF A PREFERRED EMBODIMENT

Figure 1:
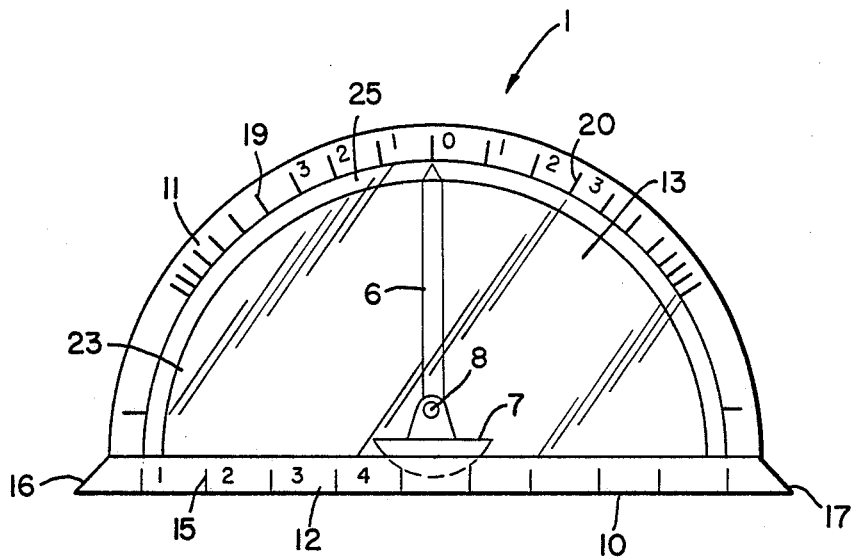
FIG. 1 is a view showing one side of a device for taking measurements, in accordance with the present invention.
Figure 3:
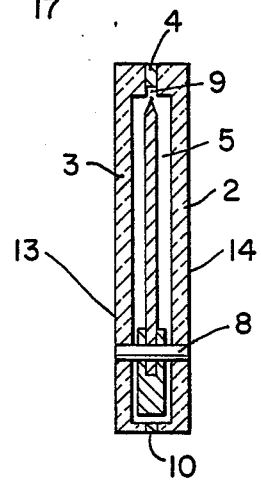
FIG. 3 is a cross section of the device for taking measurements for sewing, in accordance with the present invention.
Figure 2:
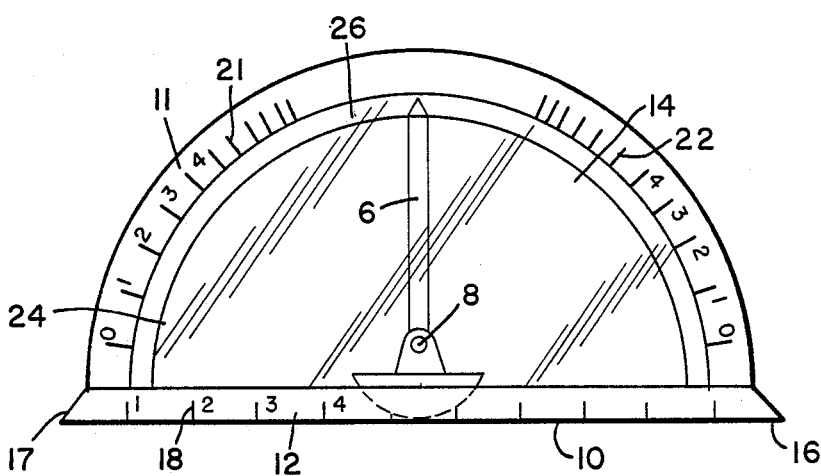
FIG. 2 is a view showing an opposite side of the inventive devices for taking measurements.

A device for taking measurements in a sewing industry or practice for subsequent sewing is identified as a whole with reference numeral 1. The device has a housing which includes two shells 2 and 3 of a transparent material, for example a transparent plastic. The shells 2 and 3 have upper and lower edges as considered in FIG. 3, which face toward one another. A partition or washer 4 is located between the flanges. The shells and the partition can be connected with each other, for example by glueing, screws, etc., to form a closed inner chamber 5.

An arm 6 is connected with a counterweight 7 and is freely turnable on a pin 8. The pin 8 is fixedly mounted in both shells 2 and 3, for example by pressing-in. It therefore performs a double function of supporting the arm 6 and simultaneously providing an additional connection of the shells with one another. For a reliable guidance, the pointing end of the arm 6 extends somewhat into a gap 9 which is retained between the upper flanges of the shells and the partition. Thus, the arm is held during turning at its both ends.

The housing which is formed of the two shells is substantially box-shaped and has a lower flat surface 10 formed as a standing surface. The device can be placed with its standing surface of a body part to be measured, and reliably supported on the body part, so as to make convenient the use of the device and to reduce the probability of errors. Also, in the position of non-use the device can be placed with its standing surface 10 on a table or the like near a user, which is also very convenient.

Since the partition 4 is composed of a non-transparent material, it renders the housing non-transparent in the regions in which it is arranged. More particularly, the partition 4 extends in the region of a circular peripheral edge of the housing and in the region of a transverse straight edge, which edges are identified as 11 and 12 respectively.

The housing has two opposite surfaces 13 and 14 and is provided with several scales. A scale 15 is provided on the surface 13 and has numbers which increase from a corner 16 to a corner 17. A scale 18 is provided on the surface 14 and has numbers which increase from the corner 17 to the corner 16. Both scales are located at the straight transverse edge 12. These scales serve for measuring a length of a body part, when the device is placed on the latter. The provision of the two scales on the opposite sides of the housing and with numbers increasing in the opposite directions permits easy measuring of body parts located on a left side and on a right side of the body.

A scale 19 extends over a left half of the circular peripheral edge 11 and has numbers which increase from the center of the circular peripheral edge to the left corner 16, while a scale 20 extends over a right half of the circular peripheral edge 11 and has numbers which increase from the center of the circular peripheral edge to the right corner 17. These scales are used for determining a linear deviation of the body part from a horizontal plane for body parts of opposite sides of the body. When the standing surface of the housung in placed onto a body part, for example a shoulder, the arm 6 deviates from zero subdivision in the event of inclined shoulder and shows the deviation of the shoulder from a horizontal plane.

A scale 21 extends over a left half of the circular peripheral edge on the surface 14 and has numbers which increase from the corner 17 to the center of the central peripheral edge, while a scale 22 extends over a right half of the circular peripheral edge on the surface 14 and has numbers which increase from the corner 16 to the center of the circular peripheral edge. The scales 21 and 22 serve for determining a deviation of a body part from a vertical plane, for body parts on a respective side of the body. All scales can be for example in cm.

The scales are located in the non-transparent regions of the housing, which are formed by interposition of the non-transparent partition 4 between the transparent shells in these regions near the circular peripheral edge 11 and the straight transverse edge 12. Also, a part of each surface 13 and 14 can be made non-transparent, for example by applying a paint 23 and 24, so that narrow regions 25 and 26 which hare transparent remain on each surface, for visualizing of only a part of the arm 6 through these regions.

The invention is not limited to the details shown since various modifications and structural changes are possible without departing in any way from the spirit of the present invention.

What is desired to be protected by Letter Patent is set forth in particular in the appended claims.

I claim:

1. A device for taking measurements for sewing, comprising
    a housing having a substantially semi-circular shape with a circular peripheral edge and straight transverse edge;
    a plurality of sclaes provided on said housing and including a transverse scale arranged at said straight transverse edge for measuring a length of a body part and two peripheral scales arranged at said circular peripheral edge for measuring deviations of the body part from horizontal and vertical planes;
    a standing surface provided on said housing in the region of said straight transverse edge so as to arrange said housing in a standing position with said standing surface on a body part to be measured or on an additional support during non-use;
    an arm rotatably supported in said housing so as to turn and point to a respective portion of said at least two scales, said arm having two ends; and
    a supporting pin which pivotally supports said arm on one of said ends, and a slot provided in said housing and guiding the other of said ends of said arm.

2. A device as defined in claim 1, wherein said housing has two opposite surfaces, said straight transverse edge having two opposite ends, said circular peripheral edge having a center, said plurality of scales including four such peripheral scales arranged so that two of said peripheral scales are located on one of said side surfaces and the other two of said peripheral scales are located on the other side surface, one of said two first-mentioned peripheral scales include one peripheral scale extending over one half of said circular peripheral edge and having numbers which increase from said center to one of said opposite ends, and the other peripheral scale extending over the other half of said circular peripheral edge and having numbers which increase from said center to the other opposite end, said other two peripheral scales including one peripheral scale which extends over one half of said circular peripheral edge and has numbers increasing from one of said ends to said center, and the other peripheral scale which extends over another half of said circular peripheral edge and has numbers increasing from the other end to said center, so as to permit determination of linear deviations of body parts from horizontal and vertical planes at opposite sides of the body respectively.

3. A device as defined in claim 1, wherein said housing is composed of two shells which are connected with one another; wherein said pin member which turnably supports said arm and at the same time serves for connecting said shells with each other.

4. A device as defined in claim 1, wherein said housing includes two shells composed of a transparent material and an intermediate partition located between said shells and composed of a non-transparent material, said partition extending in the regions of said edges so as to make said housing non-transparent in said regions, said scales being arranged in said non-transparent regions.

5. A device as defined in claim 1, wherein said housing has two opposite sides with non-transparent major areas and a transparent circular strip for visualizing a portion of said arm during its turning.

* * * * *